(12) United States Patent
Chen

(10) Patent No.: US 11,857,099 B2
(45) Date of Patent: Jan. 2, 2024

(54) FRUIT PEELER

(71) Applicant: Pian Chen, Guangdong (CN)

(72) Inventor: Pian Chen, Guangdong (CN)

( * ) Notice: Subject to any disclaimer, the term of this patent is extended or adjusted under 35 U.S.C. 154(b) by 245 days.

(21) Appl. No.: 17/537,494

(22) Filed: Nov. 30, 2021

(65) Prior Publication Data

US 2022/0175169 A1 Jun. 9, 2022

(30) Foreign Application Priority Data

Dec. 8, 2020 (CN) .......................... 202022919984.7

(51) Int. Cl.
*A47J 17/02* (2006.01)
*B26D 3/28* (2006.01)

(52) U.S. Cl.
CPC .............. *A47J 17/02* (2013.01); *B26D 3/283* (2013.01); *B26D 2003/287* (2013.01); *B26D 2210/02* (2013.01)

(58) Field of Classification Search
CPC . A47J 17/02; A47J 17/10; A47J 17/16; B26D 3/283; B26D 2003/287; B26D 2210/02
USPC .................................................. 99/591, 594
See application file for complete search history.

(56) References Cited

U.S. PATENT DOCUMENTS

| | | | | |
|---|---|---|---|---|
| 1,503,390 A * | 7/1924 | Tenney | ................... | A47J 17/16 269/21 |
| 2,483,930 A * | 10/1949 | Pauls | ...................... | A47J 17/16 D7/693 |
| 4,350,088 A * | 9/1982 | Rubio, Jr. | ................. | A23N 5/03 99/593 |
| 6,082,253 A * | 7/2000 | Ridler | .................... | A23N 7/026 99/594 |
| 6,427,332 B1* | 8/2002 | Pi | ............................ | A47J 17/02 99/593 |
| 2013/0291387 A1* | 11/2013 | Kerkhof | .................. | A47J 17/02 83/13 |
| 2013/0334347 A1* | 12/2013 | Willis | ..................... | A47J 17/02 241/168 |
| 2014/0150675 A1* | 6/2014 | Tateno | ..................... | A23N 7/08 99/540 |
| 2015/0075011 A1* | 3/2015 | Harris | ..................... | A47J 17/02 30/279.6 |
| 2015/0075012 A1* | 3/2015 | Opinel | .................. | B26B 21/527 30/295 |

(Continued)

*Primary Examiner* — Omar Flores Sanchez
(74) *Attorney, Agent, or Firm* — JCIP GLOBAL INC.

(57) ABSTRACT

A fruit peeler includes a base and a planing blade. The base includes a first rotating member and a second rotating member rotatable relative to the first rotating member. The first rotating member has a fixed arm that has a first position perpendicular to the first rotating member. One end of the fixed arm is connected to the first rotating member, and another end of the fixed arm has an insertion pin extending toward an inner side direction of the fixed arm and rotatable relative to the fixed arm. The planing blade is mounted on a planer frame that is arranged at the fixed arm, and is connected to the second rotating member. The planer frame has a third position perpendicular to the second rotating member. The planing blade can perform a reciprocating curve movement in an axial direction of the insertion pin when the second rotating member rotates.

20 Claims, 4 Drawing Sheets

(56) References Cited

U.S. PATENT DOCUMENTS

| | | | |
|---|---|---|---|
| 2015/0289703 A1* | 10/2015 | Smith | A47J 17/16 |
| | | | 99/593 |
| 2018/0132647 A1* | 5/2018 | Tateno | A47J 17/02 |
| 2018/0184593 A1* | 7/2018 | Wong | A01F 7/02 |
| 2019/0231111 A1* | 8/2019 | Cotter | A47J 17/16 |

* cited by examiner

FRUIT PEELER

CROSS-REFERENCE TO RELATED APPLICATION

This application claims the priority benefit of China application serial no. 202022919984.7, filed on Dec. 8, 2020. The entirety of the above-mentioned patent application is hereby incorporated by reference herein and made a part of this specification.

BACKGROUND

Technical Field

The present invention belongs to the technical field of fruit peeling tools, in particular relative to a fruit peeler.

Description of Related Art

There are mainly three kinds of peelers on the market. The first kind is a hand-held straight peeler, the second kind is a hand-held Y-shaped peeler, and the third kind is a hand-operated semi-automatic peeler.

Although the straight peeler and Y-shaped peeler are small, easy to be carried and can be used when going out, the peeling effect largely depends on the user's proficiency. Most people use these two peelers to peel. Generally, the peeling speed is slow, the peeling is not complete, and it is easy to have remaining small peels.

Although the hand-operated semi-automatic peeler has fast peeling speed and complete peeling, its structure is relatively complex. The planer blade needs to be connected with the crank through transmission members such as conveyor belt or gear, which has high a manufacturing cost. In addition, the overall product is also large and inconvenient to be carried. It is generally used at home.

SUMMARY

The purpose of the present invention is to solve at least one of the above-mentioned technical problems, and aims to provide a fruit peeler that has a small overall volume, is convenient to be carried, easy to be operated, and has a fast peeling speed.

The present invention is realized through the following technical solutions.

The present invention provides a fruit peeler, which includes a base and a planing blade. The base comprises a first rotating member and a second rotating member. The first rotating member is provided with a fixed arm, and the fixed arm is arranged to have a first position relatively perpendicular to the first rotating member. One end of the fixed arm is connected to the first rotating member, and another end of the fixed arm is provided with an insertion pin extending toward an inner side direction of the fixed arm and rotatable relative to the fixed arm. The second rotating member is arranged to be rotatable relative to the first rotating member. The planing blade is mounted on a planer frame, and the planer frame is arranged at an outer side position of the fixed arm and is connected to the second rotating member. The planer frame is arranged to have a third position relatively perpendicular to the second rotating member, and the planing blade is arranged to be able to perform a reciprocating curve movement in an axial direction of the insertion pin when the second rotating member is rotated relative to the first rotating member.

In the above technical solution, the insertion pin is inserted into a fruit core of the fruit to fix the fruit. The fingers of one hand grasp the fixed arm, and the fingers of another hand grasp the second rotating member and press the planer frame toward the inner side direction such that the planing blade mounted on the planer frame is in contact with the skin of the fruit, and then rotates the second rotating member, which can make the blade perform curve movement from one end of the fruit core to the other end of the fruit core to peel off part of the fruit skin on the fruit that is in the same direction as the fruit core. Then loosen the fingers that press the planer frame such that the planing blade do not contact with the skin of the fruit, and at the same time, turn the second rotating member back to the original position reversely. Use the fingers to move the fruit to rotate for a small angle, and then press the planer frame again with your fingers and at the same time, by rotating the second rotating member, part of the fruit skin on the fruit that is in the same direction as the fruit core can be peeled off again. Repeat the above operation, all the fruit skin on the fruit can be peeled off, and fingers will not touch the fruit pulp, which is clean and hygienic, fast in peeling speed. The fruit peeler can be operated by hand or can be operated when placing on a surface of placement.

Preferably, the fixed arm is rotatably connected to the first rotating member through a first rotating connecting member, such that the fixed arm can be rotated relative to the first rotating member to a first position or be rotated to a second position relatively horizontal to the first rotating member. The planer frame is rotatably connected to the second rotating member through a second rotating connecting member, such that the planer frame can be rotated relative to the second rotating member to the third position or be rotated to a fourth position relatively horizontal to the second rotating member. In this way, when not in use, the fixed arm and planer frame can be rotated to a horizontal position for storage, which can save packaging space and is convenient for carrying when going out.

Preferably, the first rotating connecting member comprises a first connecting base and a first connecting nail, and the first connecting base is fixed to the first rotating member. The fixed arm is rotatably connected to the first connecting base through the first connecting nail passing through an end of the fixed arm and the first connecting base. In this way, it is simple in structure and the convenient for assembling. In addition, by adjusting the tightness of the first connecting nail during assembling, the frictional force when the fixed arm rotates relative to the first connecting base can be adjusted, such that the fixed arm has a certain damping effect when it rotates. The fixed arm is not easy to shake and collide during transportation or carrying.

Preferably, the second rotating connecting member comprises a second connecting base and a second connecting nail, and the second connecting base is fixed to the second rotating member. The planer frame is rotatably connected to the second connecting base through a second connecting nail passing through an end of the planer frame and the second connecting base. In this way, it is simple in structure and the convenient for assembling. In addition, by adjusting the tightness of the second connecting nail during assembling, the friction force when the planer frame rotates relative to the second connecting base can be adjusted, such that the planer frame has a certain damping effect when it rotates. The planer frame is not easy to shake and collide during transportation or carrying.

Preferably, the insertion pin is connected to the fixed arm through a turntable. The insertion pin is vertically arranged at a center of the turntable and protrudes relative from a surface of the turntable, and the insertion pin is arranged to be rotatable relative to the turntable. The turntable is rotatably connected to an end of the fixed arm through a connecting pin provided in a radial direction of the turntable, and the turntable can be turned, with the connecting pin as a rotating shaft, in the inner side direction and an outer side direction of the fixed arm. In this way, no matter what the size of the fruit is, it can be ensured that the insertion pin is inserted into the fruit core of the fruit, and that the fruit is located at a position where the fruit skin can be planed by the planing blade.

Preferably, a guiding blade is provided on the planing blade, and a cutting edge of the guiding blade is arranged to be intersected with a cutting edge of the planing blade obliquely. In this way, the planing blade may push the fruit to rotate when the fruit skin is planed, which is convenient for a next peeling operation without moving the fruit to rotate with the fingers. The operation is more convenient and the peeling is faster.

Preferably, the first rotating member comprises a first circular ring. The second rotating member comprises a second circular ring. An outer diameter of the first circular ring is arranged to be smaller than an inner diameter of the second circular ring, and the first circular ring is placed in the second circular ring and rollingly connected by rolling members arranged between an outer wall of the first circular ring and an inner wall of the second circular ring. The above-mentioned structure is similar to the bearing structure, so it is simple in structure and the overall product volume is relatively small. And the inner holes of the first circular ring and the second circular ring can avoid fruits, and the length of the fixed arm and of the planer frame can be made shorter, which is convenient for folding and carrying.

Preferably, the number of the fixed arms is two. The two fixed arms are spaced and symmetrically arranged on the first circular ring, and a connecting line between the two fixed arms passes through a center of the first circular ring. In this way, the fruit can be placed between the two fixed arms and clamped by the two fixed arms, and two fingers of a hand can respectively pinch the outer sides of the two fixed arms for operation. The operation is more convenient and the grip is more stable.

Preferably, the second circular ring is connected to a cover provided with a concave surface, and a diameter of an opening of the concave surface is cooperated with the inner diameter of the second circular ring. The opening of the cover is arranged to face a direction in which the fixed arm extends when the fixed arm is perpendicular to the first circular ring. In this way, the cover can play a role in collecting the fruit skin.

Preferably, the first rotating member comprises a first shell, and the second rotating member comprises a second shell. The first shell is stacked on the second shell, or is placed in a concave surface provided on the second shell and rotatably connected to the second shell through a fourth connecting nail. In this way, the first shell can rotate relative to the second shell with the fourth connecting nail as the rotating shaft.

The beneficial effects of the present invention are as follows. (1) The operation is simple, and fast peeling can be realized by repeatedly rotating the second rotating member, and the planing blade moves back and forth in a curve along the direction of the fruit core, which is different from rotation of the planing blade of the existing product along the circumference direction of the fruit core and the fruit skin is peeled relative completely. (2) The overall volume is small, and the planer frame and the fixed arm can be folded to a horizontal position, which is convenient for carrying and convenient to be carried outdoors when camping.

DESCRIPTION OF THE EMBODIMENTS

The present invention will be further described in detail below with reference to the accompanying drawings. The accompanying drawings are only used for exemplary description and cannot be understood as a limitation to the present patent.

In order to describe the present embodiment more concisely, some parts in the accompanying drawings or description that are well known to those skilled in the art but are not related to the main content of the invention will be omitted. In addition, for ease of description, some parts in the accompanying drawings may be omitted, enlarged or zoomed out, but they do not represent the actual product size or overall structure.

Embodiment 1

Figure 1:
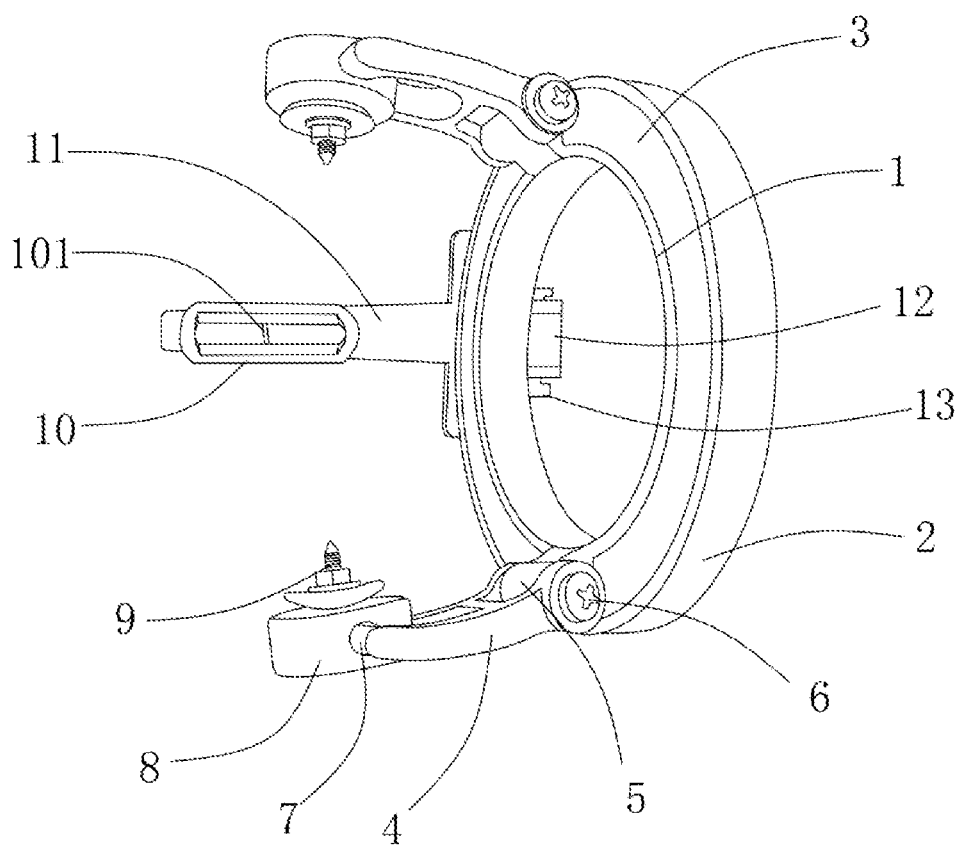
FIG. 1 is a schematic structural view of embodiment 1 of the present invention.

As shown in FIG. 1, the present invention provides a fruit peeler. The fruit peeler includes a base and a planing blade. The base adopts a structure similar to the bearing and comprises a first circular ring 1 and a second circular ring 2. An outer diameter of the first circular ring 1 is arranged to be smaller than an inner diameter of the second circular ring 2. The first circular ring 1 is placed in the second circular ring 2 and rollingly connected by rolling members 3 arranged between an outer wall of the first circular ring 1 and an inner wall of the second circular ring 2. In the present embodiment, the rolling members are roll balls, and a sealing ring is provided on an outer side of the roll balls to prevent dust. The first circular ring 1 is provided with two fixed arms 4. The two fixed arms 4 are spaced and symmetrically arranged on the first circular ring 1, and the connecting line between the two fixed arms 4 passes through a center of the first circular ring. A right end of the fixed arm 4 is rotatably connected to the first circular ring 1 through a first rotating connecting member. The first rotating connecting member comprises a first connecting base 5 and a first connecting nail 6, and the first connecting base 5 is fixed to a left surface of the first circular ring 1. The fixed arm 4 is rotatably connected to the first connecting base 5 through the first connecting nail 6 passing through the right end of the fixed arm 4 and the first connecting base 5. Tooth-shaped surfaces cooperated with each other are provided at a position where the fixed arm 4 contacts and fits with the first connecting base 5, such that there is a certain damping effect and gear effect when the fixed arm 4 rotates relative to the first connecting base 5, and therefore the fixed arm 4 will not rotate relative to the first connecting base 5 under action of gravity. The fixed arm 4 can rotate relative to the first circular ring 1, with the first connecting nail 6 as a rotating shaft, to a first position perpendicular to the first circular ring 1 or a second position horizontal to the first circular ring 1. A left end of the fixed arm 4 is a fork-shaped structure, and is rotatably connected a turntable 8 by a connecting pin 7. The connecting pin 7 passes through the turntable 8 in a radial direction. The turntable can be turned in inner side (i.e., an upper side of the fixed arm 4 in the figure) and outer side (i.e., a lower side of the fixed arm 4 in the figure) directions of the fixed arm 4, with the connecting pin as a rotating shaft. An insertion pin 9 is mounted at a center of the turntable 8. The insertion pin 9 is vertically arranged at the center of the turntable and protrudes relative from a surface of the turntable 8, and the insertion pin 9 is arranged to be rotatable relative to the turntable 8.

As shown in FIG. 1, the planing blade 10 is arranged in the same direction in which length of the planer frame 11 extends, and the planer frame 11 is arranged at the outer side position of the fixed arm 4 and is connected to the second circular ring 2. The right end of the planer frame 11 is rotatably connected to the second circular ring 2 through a second rotating connecting member. The second rotating connecting member comprises a second connecting base 12 and a second connecting nail 13. The second connecting base 12 is fixed to the second rotating member 2, and the planer frame 11 is arranged to be located at an outer side of the second circular ring 2. The planer frame 11 is rotated to the third position with the second connecting nail 13 as a rotation shaft or is rotated outward relative to the second circular ring 2 to a horizontal fourth position.

Figure 2:
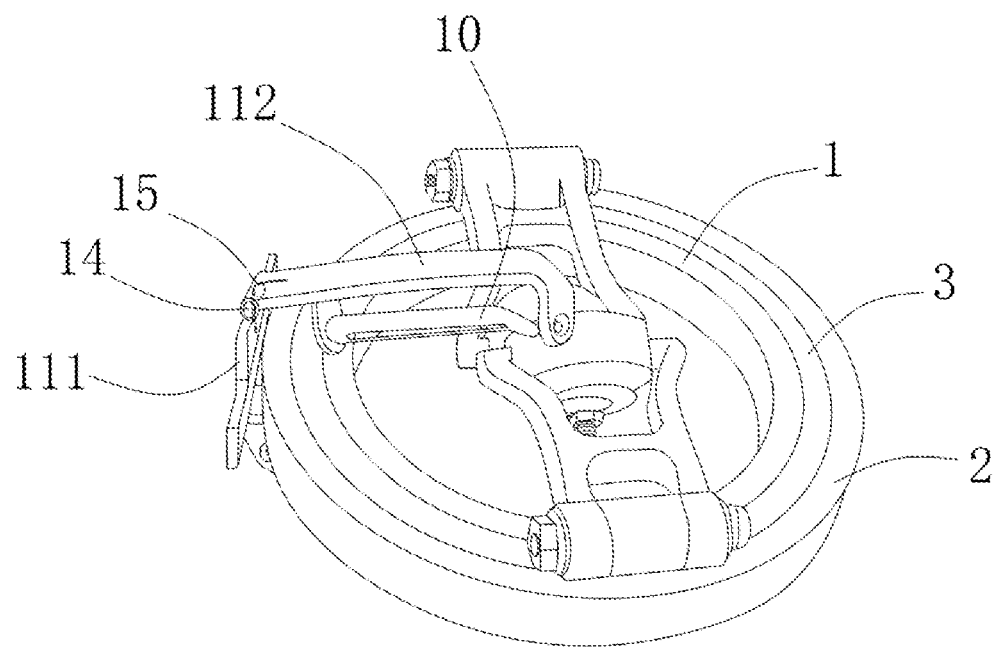
FIG. 2 is a schematic structural view of a fixed arm and a planer frame when folded to a horizontal position in Embodiment 1 of the present invention.

As shown in FIG. 2, the planer frame 11 comprises a lower planer frame 111 and an upper planer frame 112. The planing blade 10 are mounted on an inner side of the upper planer frame 112, and a lower end of the lower planer frame 111 is connected to the second rotating member 2 through a second rotating connecting member. A lower end of the upper planer frame 112 is pivotally connected to an upper end of the lower planer frame 111 through the third connecting nail 14 and the torsion spring 15 is sleeved on the third connecting nail 14. One end of the torsion spring 15 is pressed against an inner side surface of the lower planer frame 111, and the other end of the torsion spring 15 is pressed against an inner side of the upper planer frame 112. The upper planer frame 112 can be rotated inward relative to the lower planer frame 111 to a horizontal position relative to the second circular ring 2 with the third connecting nail 14 as a rotation shaft, and thus facilitating the folding of the planer frame 11.

Figure 3:
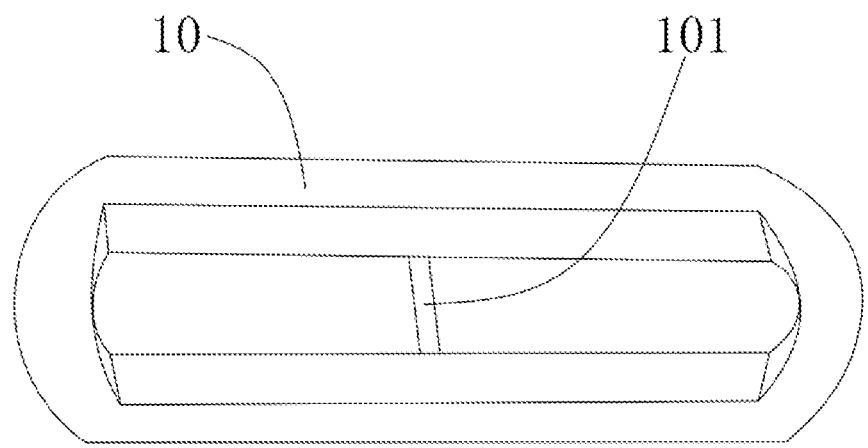
FIG. 3 is a schematic structural view of a planing blade of embodiment 1 of the present invention.

As shown in FIG. 1 and FIG. 3, as a further improvement, a guiding blade 101 is provided on the planing blade 10. A cutting edge of the guiding blade 101 is arranged to be intersected with a cutting edge of the planing blade 10 obliquely, and an angle of intersection is between 3 degrees and 5 degrees. In this way, the planing blade 10 may push the fruit to rotate when the fruit skin is planed, which is convenient for a next peeling operation without moving the fruit to rotate with the fingers. The operation is more convenient and the peeling is faster.

Embodiment 2

Figure 4:
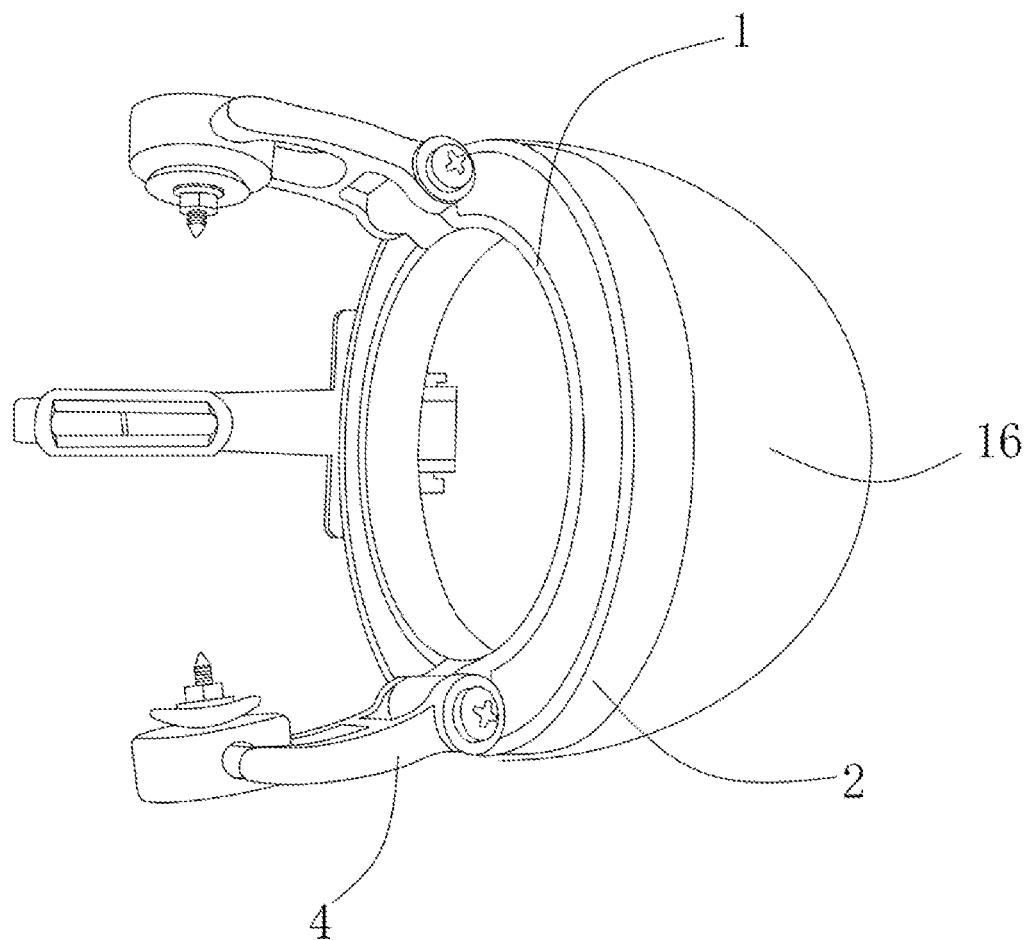
FIG. 4 is a schematic structural view of embodiment 2 of the present invention.

As shown in FIG. 4, the structure of the present embodiment is similar to that of Embodiment 1, and the difference lies in that the second circular ring 2 is connected to a cover 16 provided with a concave surface, and a diameter of an opening of the concave surface is cooperated with the inner diameter of second circular ring 2. The opening of the cover 16 is arranged to face a direction in which the fixed arm 4 extends when the fixed arm 4 is perpendicular to the first circular ring 1. In this way, the cover 16 can play a role in collecting the fruit skin.

Embodiment 3

Figure 5:
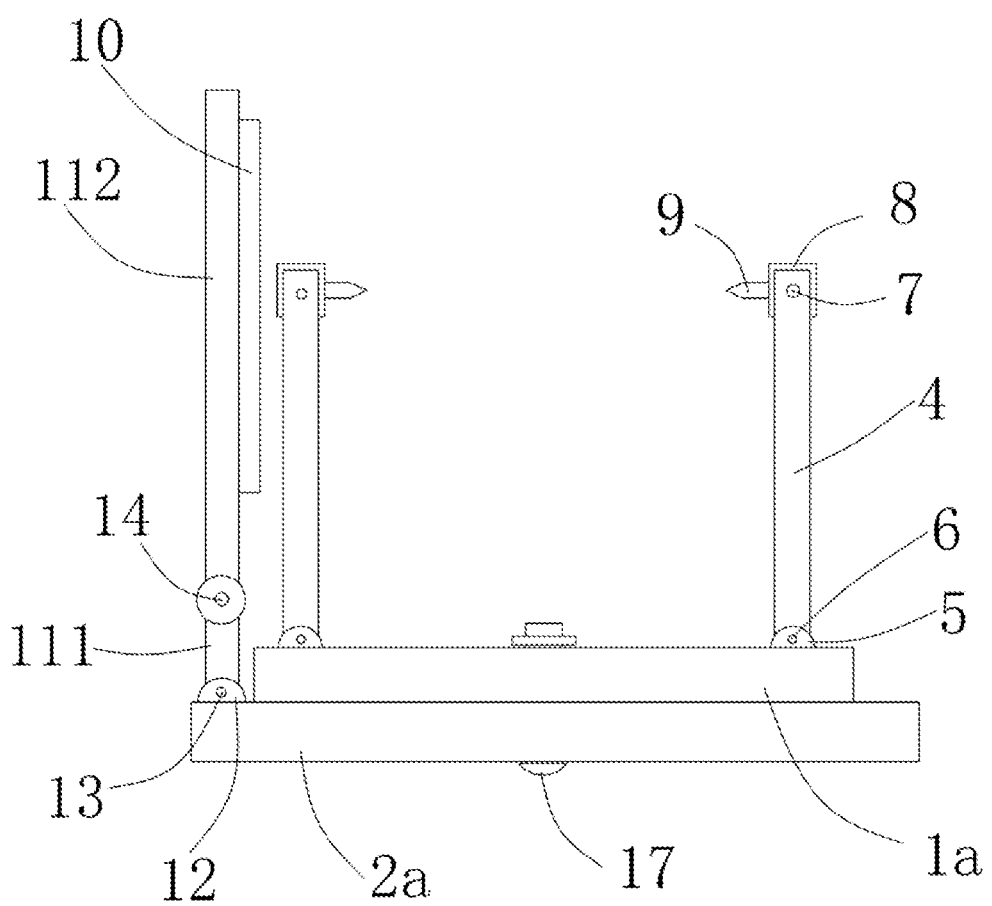
FIG. 5 is a schematic structural view of embodiment 3 of the present invention.

As shown in FIG. 5, the structure of the present embodiment is similar to that of Embodiment 1, and the difference lies in that the base comprises a first shell 1*a*, the second rotating member comprises a second shell 2*a*, and the first shell 1*a* is stacked on the second shell 2*a* and is rotatably connected to the second shell 2*a* through a fourth connecting nail 17. The first shell 1*a* can also be placed in a concave surface provided on the second shell 2*a*, and the first shell 1*a* is also provided with a concave surface at the same time, such that the fruit surface can be avoided, and the length arranging requirement of the planer frame 11 can be reduced. Two fixed arms 4 are spaced and symmetrically arranged on an upper surface of the first shell 1*a*, and the connecting line between the two fixed arms 4 passes through a center of the first shell. The planer frame 11 is arranged on an upper surface of the second shell 2*a*.

The above are only specific embodiments of the present invention, and the design concept of the present invention is not limited to them. Any insubstantial modification made to the present invention using the concept of the spirit of the present invention shall fall within the protection scope of the present invention.

What is claimed is:

1. A fruit peeler, comprising a base and a planing blade, wherein the base comprises a first rotating member and a second rotating member, the first rotating member is provided with a fixed arm, and the fixed arm is arranged to have a first position relatively perpendicular to the first rotating member, one end of the fixed arm is connected to the first rotating member, and another end of the fixed arm is provided with an insertion pin extending toward an inner side direction of the fixed arm and rotatable relative to the fixed arm, the second rotating member is arranged to be rotatable relative to the first rotating member, the planing blade is mounted on a planer frame, and the planer frame is arranged at an outer side position of the fixed arm and is connected to the second rotating member, the planer frame is arranged to have a third position relatively perpendicular to the second rotating member, and the planing blade is arranged to be able to perform a reciprocating curve movement in an axial direction of the insertion pin when the second rotating member rotates relative to the first rotating member.

2. The fruit peeler according to claim 1, wherein the fixed arm is rotatably connected to the first rotating member through a first rotating connecting member, such that the fixed arm is able to be rotated relative to the first rotating member to the first position or be rotated to a second position relatively horizontal to the first rotating member, the planer frame is rotatably connected to the second rotating member through a second rotating connecting member, such that the planer frame is able to be rotated relative to the second rotating member to the third position or be rotated to a fourth position relatively horizontal to the second rotating member.

3. The fruit peeler according to claim 2, wherein the first rotating connecting member comprises a first connecting base and a first connecting nail, the first connecting base is fixed to the first rotating member, and the fixed arm is rotatably connected to the first connecting base through the first connecting nail passing through an end of the fixed arm and the first connecting base.

4. The fruit peeler according to claim 2, wherein the second rotating connecting member comprises a second connecting base and a second connecting nail, and the second connecting base is fixed to the second rotating member, the planer frame is rotatably connected to the second connecting base through the second connecting nail passing through an end of the planer frame and the second connecting base.

5. The fruit peeler according to claim 2, wherein the insertion pin is connected to the fixed arm through a turntable, the insertion pin is vertically arranged at a center of the turntable and protrudes relative from a surface of the turntable, and the insertion pin is arranged to be rotatable relative to the turntable, the turntable is rotatably connected to an end of the fixed arm through a connecting pin provided in a radial direction of the turntable, and the turntable is able to be turned, with the connecting pin as a rotating shaft, in the inner side direction and an outer side direction of the fixed arm.

6. The fruit peeler according to claim 1, wherein a guiding blade is provided on the planing blade, and a cutting edge of the guiding blade is arranged to be intersected with a cutting edge of the planing blade obliquely.

7. The fruit peeler according to claim 1, wherein the first rotating member comprises a first circular ring, the second rotating member comprises a second circular ring, an outer diameter of the first circular ring is arranged to be smaller than an inner diameter of the second circular ring, and the first circular ring is placed in the second circular ring and rollingly connected by rolling members arranged between an outer wall of the first circular ring and an inner wall of the second circular ring.

8. The fruit peeler according to claim 7, wherein a number of the fixed arms is two, the two fixed arms are spaced and symmetrically arranged on the first circular ring, and a connecting line between the two fixed arms passes through a center of the first circular ring.

9. The fruit peeler according to claim 8, wherein the second circular ring is connected to a cover provided with a concave surface, and a diameter of an opening of the concave surface is cooperated with the inner diameter of the second circular ring, and the opening of the cover is arranged to face a direction in which the fixed arm extends when the fixed arm is in the first position.

10. The fruit peeler according to claim 1, wherein the first rotating member comprises a first shell, the second rotating member comprises a second shell, and the first shell is stacked on the second shell, or is placed in a concave surface provided on the second shell and rotatably connected to the second shell through a fourth connecting nail.

11. The fruit peeler according to claim 2, wherein the first rotating member comprises a first circular ring, the second rotating member comprises a second circular ring, an outer diameter of the first circular ring is arranged to be smaller than an inner diameter of the second circular ring, and the first circular ring is placed in the second circular ring and rollingly connected by rolling members arranged between an outer wall of the first circular ring and an inner wall of the second circular ring.

12. The fruit peeler according to claim 3, wherein the first rotating member comprises a first circular ring, the second rotating member comprises a second circular ring, an outer diameter of the first circular ring is arranged to be smaller than an inner diameter of the second circular ring, and the first circular ring is placed in the second circular ring and rollingly connected by rolling members arranged between an outer wall of the first circular ring and an inner wall of the second circular ring.

13. The fruit peeler according to claim 4, wherein the first rotating member comprises a first circular ring, the second rotating member comprises a second circular ring, an outer diameter of the first circular ring is arranged to be smaller than an inner diameter of the second circular ring, and the first circular ring is placed in the second circular ring and rollingly connected by rolling members arranged between an outer wall of the first circular ring and an inner wall of the second circular ring.

14. The fruit peeler according to claim 5, wherein the first rotating member comprises a first circular ring, the second rotating member comprises a second circular ring, an outer diameter of the first circular ring is arranged to be smaller than an inner diameter of the second circular ring, and the first circular ring is placed in the second circular ring and rollingly connected by rolling members arranged between an outer wall of the first circular ring and an inner wall of the second circular ring.

15. The fruit peeler according to claim 6, wherein the first rotating member comprises a first circular ring, the second rotating member comprises a second circular ring, an outer diameter of the first circular ring is arranged to be smaller than an inner diameter of the second circular ring, and the first circular ring is placed in the second circular ring and rollingly connected by rolling members arranged between an outer wall of the first circular ring and an inner wall of the second circular ring.

16. The fruit peeler according to claim 2, wherein the first rotating member comprises a first shell, the second rotating member comprises a second shell, and the first shell is stacked on the second shell, or is placed in a concave surface provided on the second shell and rotatably connected to the second shell through a fourth connecting nail.

17. The fruit peeler according to claim 3, wherein the first rotating member comprises a first shell, the second rotating member comprises a second shell, and the first shell is stacked on the second shell, or is placed in a concave surface provided on the second shell and rotatably connected to the second shell through a fourth connecting nail.

18. The fruit peeler according to claim 4, wherein the first rotating member comprises a first shell, the second rotating member comprises a second shell, and the first shell is stacked on the second shell, or is placed in a concave surface provided on the second shell and rotatably connected to the second shell through a fourth connecting nail.

19. The fruit peeler according to claim 5, wherein the first rotating member comprises a first shell, the second rotating member comprises a second shell, and the first shell is stacked on the second shell, or is placed in a concave surface provided on the second shell and rotatably connected to the second shell through a fourth connecting nail.

20. The fruit peeler according to claim 6, wherein the first rotating member comprises a first shell, the second rotating member comprises a second shell, and the first shell is stacked on the second shell, or is placed in a concave surface provided on the second shell and rotatably connected to the second shell through a fourth connecting nail.

* * * * *